United States Patent [19]
Chandler et al.

[11] Patent Number: 6,079,297
[45] Date of Patent: Jun. 27, 2000

[54] FIBER OPTIC PRECISION LINEAR STRIPPER

[75] Inventors: William Keith Chandler, Woodsboro; Gary N. Kles, Eldersbury; Andrei Csipkes, Savage, all of Md.

[73] Assignee: Ciena Corporation, Linthicum, Md.

[21] Appl. No.: 09/163,477

[22] Filed: Sep. 30, 1998

[51] Int. Cl.[7] ................................. H02G 1/12
[52] U.S. Cl. ................. 81/9.51; 30/90.4; 83/879
[58] Field of Search ............... 81/9.51; 30/90.4; 83/51, 614, 879, 105

[56] References Cited

U.S. PATENT DOCUMENTS

| | | |
|---|---|---|
| 2,360,363 | 10/1944 | Pope . |
| 2,434,640 | 1/1948 | Burdwood . |
| 3,817,132 | 6/1974 | Emery et al. ..................... 81/9.51 X |
| 5,050,302 | 9/1991 | Mills ................................. 30/90.4 X |
| 5,845,554 | 12/1998 | Kozyrski ........................... 83/614 X |

*Primary Examiner*—James G. Smith
*Attorney, Agent, or Firm*—Daniel N. Daisak; David L. Soltz

[57] ABSTRACT

A linear stripper for removing a coating on a fiber optic cable, includes a guide rail and a cutting assembly slidably connected to the guide rail. The cutting assembly has a passage configured to accommodate a fiber optic cable threaded therethrough. A blade assembly has a pair of blades disposed within the cutting assembly, with each of the pair of blades being horizontally positioned on an opposing side of the passage. A cutting tip of each of the blades simultaneously scores an outer coating of a fiber optic cable placed in the passage, as the cutting assembly slides along the guide rail. The outer coating is then peeled away from the fiber optic cable along the scored incisions.

14 Claims, 5 Drawing Sheets

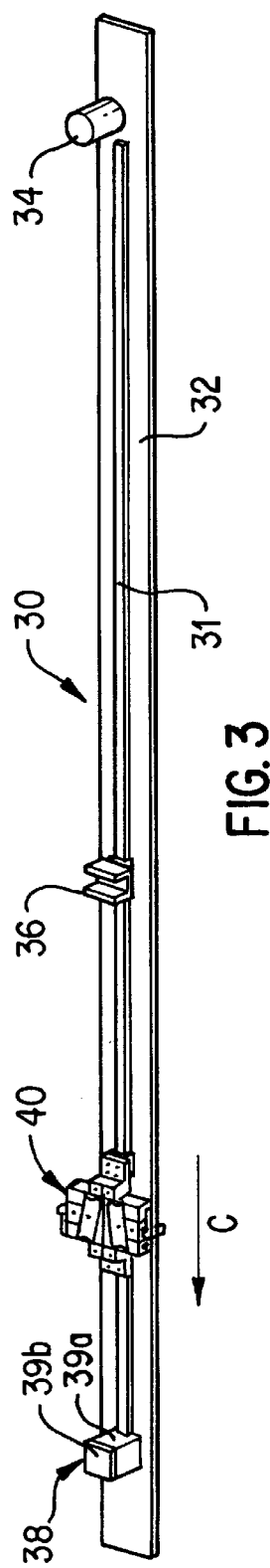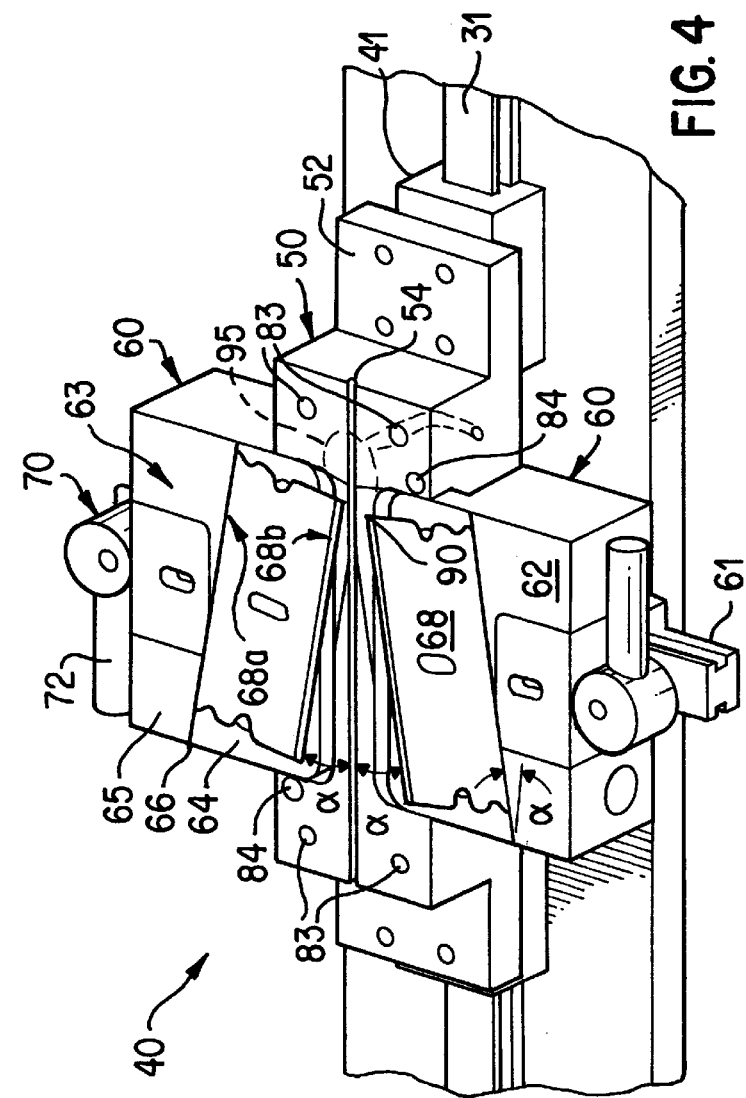

FIBER OPTIC PRECISION LINEAR STRIPPER

BACKGROUND OF THE INVENTION

1. Field of The Invention

The present invention relates generally to stripping or removing protective coatings from optical fibers, and more particularly to an apparatus for quickly and precisely stripping an outer buffer coating of an optical fiber prior to processing, without damaging the optical qualities of the optical fiber.

2. Background of the Related Art

A fiber optic cable typically comprises an optical fiber concentrically surrounded by a series of protective layers as generally shown in FIG. 1 and FIG. 6. More specifically, as shown in FIG. 1, the optical fiber 8 consists of a core region 10 that provides a path for optical signals traveling along the optical fiber. The core region 10 is surrounded by a cladding region 12 whose refractive index may be altered to achieve a desired propagation path of the optical signals traveling along the core region 10. The cladding region 12 is in turn surrounded by an outer protective coating 14 to protect the core region 10 and the cladding region 12 from damage, such as nicks, scratches or dents, which could degrade the long term quality and performance of the optical fiber.

As shown in FIG. 1 and FIG. 6, the optical fiber 8 is protected by a buffer layer 16. The buffer layer 16 is typically a firm polymer which provides increased protection to the fiber while also increasing the fiber bending stiffness. The buffer layer 16 is formed directly around the inner optical fiber 8 and there is usually a significant adhesive force between the buffer layer 16 and the protective coating 14 surrounding the optical fiber. The buffer layer may additionally comprise a soft polymer, such as acrylate, which coats and adheres to the glass fiber.

The buffer layer 16 is surrounded by strengthening fibers 17 (see FIG. 6), such as KEVLAR, to provide additional strength for pulling the fiber optic cable through conduit and for other applications. The outer layer 18 is typically a 3 mm polymer jacket similar to the jacketing surrounding standard electrical wire.

As is well known, electro-optical data transfer systems comprise a wide variety of interacting electrical, optical and electro-optical modules. In a typical data transfer system electrical signals are converted to light signals, the light signals are amplified, filtered, and/or multiplexed, and then converted back to electrical signals. The connections between the modules must be extremely precise, and must be carried out with the utmost care to avoid damaging the optical fibers.

During the manufacture of optical assemblies, the ends of the optical fibers may be joined together by a fusion process wherein the separate and confronting ends of the optical fibers are fused together. Alternatively, a connector may be placed on each of the confronting ends of the optical fiber and thereafter the connectors are coupled together using, for example, a bulkhead. Moreover, a connector may also be used for connecting an optical fiber and an electro-optical module.

For example, in the conventional in-line amplifier of FIG. 2, light entering the amplifier 21 is amplified using a laser pump 22. The laser pump 22 itself contains an optical fiber lead which is connected to the amplifier module 21. However, prior to making the connections, the buffer layer 16 must be stripped or removed from the lead of the laser pump 22. The buffer layer 16 must be removed because the laser lead must be wrapped into a fiber cassette, and, with the buffer layer attached, there is insufficient space to accommodate the laser lead in the cassette.

However, using conventional mechanical and thermal stripping methods to remove the buffer layer, it was found that more than 50% of the laser leads were rendered unusable due to damage to the underlying optical fiber during the buffer layer removal process. This not only reduces the throughput of the electro-optical assembly, it significantly adds to the cost of the assembly due to the waste of the optical resource or component, i.e., the laser pump. Moreover, nicks or damage to the outer coating during the buffer layer removal process may cause light dispersion in the optical fiber, thereby degrading its performance. Such nicks or damage can also lead to early failures or otherwise reduce the serviceable life of the optical fiber.

Accordingly, a need exits for an apparatus that can quickly and effectively remove the buffer coating from an optical fiber, without damaging or nicking the outer coating of an optical fiber.

SUMMARY OF THE INVENTION

An object of the present invention is to provide a stripper apparatus for removing a buffer coating from an optical fiber without damaging the outer coating of the optical fiber.

A further object of the present invention is to provide the stripper apparatus in such a configuration whereby the removal operation is carried out quickly and with consistent repeatability across many different operators or technicians.

A still further object of the present invention is to reduce the overall cost of an electro-optical assembly by reducing waste of optical resources or components caused by faulty buffer coating removal while prolonging the service life of the assembly.

Yet another object of the present invention is to provide a stripper apparatus that is adjustable for different diameter fibers and/or different diameter fiber coatings.

In general, the present invention comprises a linear stripper for removing a coating on a fiber optic cable, and includes a guide rail and a cutting assembly slidably connected to the guide rail. The cutting assembly has a passage configured to accommodate a fiber optic cable threaded therethrough. A blade assembly has a pair of blades disposed within the cutting assembly, with each of the pair of blades being horizontally positioned on an opposing side of the passage. A cutting tip of each of the blades simultaneously scores an outer coating of a fiber optic cable placed in the passage, as the cutting assembly slides along the guide rail. The outer coating is then peeled away from the fiber optic cable along the scored incisions.

Preferably, a horizontal blade plane defined by the cutting tips of the blades within the blade assembly, and a horizontal fiber plane defined by a horizontal centerline of a fiber optic cable placed in the passage, are separated by a designated vertical distance, such that the cutting tips of the blades score the outer coating at a location below the horizontal centerline of the fiber optic cable placed in the passage. This designated vertical distance is approximately equal to a radius of an inner coating coaxially disposed along the fiber optic cable inwardly of the outer coating.

Moreover, each of a vertical blade plane defined by respective of the cutting tips of the blades, and a vertical fiber plane defined by a vertical centerline of a fiber optic cable placed in the passage, are separated by a designated horizontal distance. This horizontal distance may be approximately equal to a radius of an inner coating coaxially disposed along the fiber optic cable inwardly of the outer coating, and preferably equal to about one-half the radius.

The blades are disposed at an acute angle within the cutting assembly, the acute angle being defined by a cutting edge of respective of the blades with reference to the passage, such that only a portion of the cutting edge of the blades score an outer coating of a fiber optic cable placed in the passage. The acute angle is approximately 5° to 15°, and preferably 10°.

In another aspect, the present invention provides a method of removing an outer coating on a fiber optic cable comprising the general steps of mounting a module board containing a fiber optic cable on a bracket attached to a guide rail; threading a distal end of the fiber optic cable through a passage in a cutting assembly; clamping a distal end of the fiber optic cable in a clamping mechanism attached at one end of the guide rail; engaging cutting edges of the blades with the outer coating on the fiber optic cable; and sliding the cutting assembly along the guide rail in a direction from the bracket toward the clamping mechanism, to thereby score the outer coating with the cutting edges of the blades. The outer coating is then peeled away from the underlying fiber along the scored incision.

DESCRIPTION OF THE DRAWINGS

The drawings illustrate an embodiment of the invention, in which:

FIG. 3 is a perspective view of the fiber optic precision linear stripper of the present invention;

FIG. 4 is a detailed perspective view of the cutting assembly of FIG. 3;

DETAILED DESCRIPTION OF THE PREFERRED EMBODIMENTS

Figure 1:
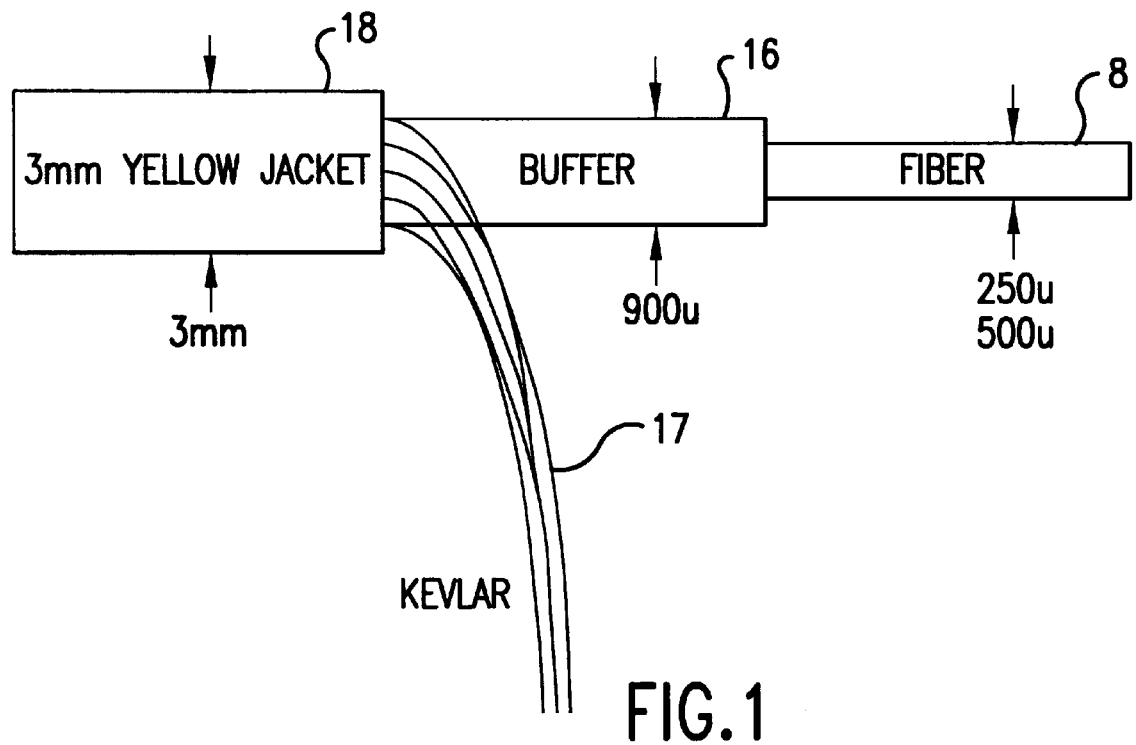
FIG. 1 is a schematic diagram of a fiber optic cable.
Figure 2:
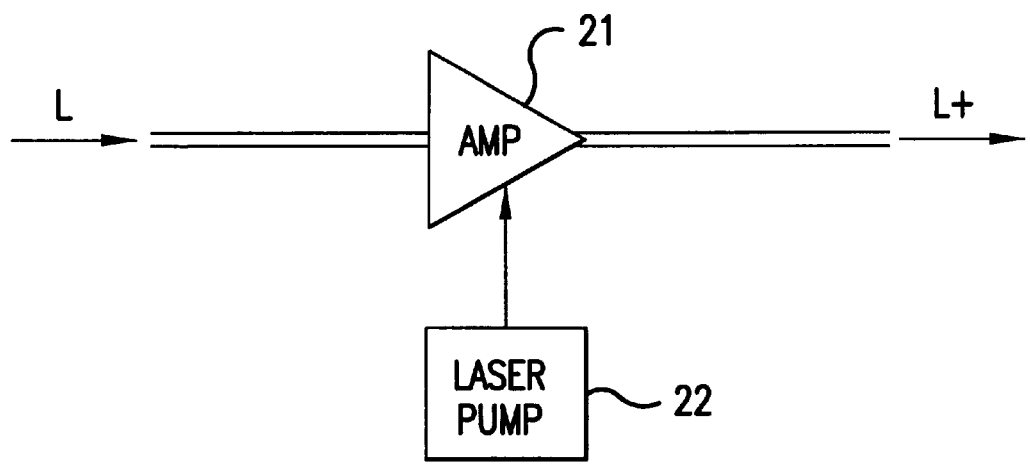
FIG. 2 is a schematic diagram of an in-line amplifier using a laser pump.

The precision linear stripper of the present invention can be used for stripping any length of optical fiber, whether or not attached to an electro-optical module. Also, while described with respect to removing a polymeric buffer layer, the structure and principles are equally applicable to stripping or removing other polymeric and non-polymeric coatings or layers surrounding an optical fiber.

Referring first to FIG. 3 and FIG. 4, the precision linear stripper 30 generally comprises an elongated guide rail 31 serving as the backbone or connection assembly for the subassemblies of the present invention. The guide rail 31 is preferably mounted on a wider and longer base 32 for added stability although it need not be.

A cutter assembly 40 is slidably attached to the rail 31. The cutter assembly 40 includes a slide 41 which contacts the rail 31 to allow the entire cutter assembly 40 to slide back and forth longitudinally along the rail 31. Any suitable slide and rail assembly known to those of ordinary skill in the art may be used to provide the desired sliding movement.

A mandrel 34 is provided at one end of the base 32 for wrapping long lengths of optical fiber to be stripped. Of course if the base 32 is not provided, the mandrel can be connected directly to one end of the rail 31. A module or board holder 36 is disposed on the rail 31 for buffer layer removal of optical fiber devices assembled on the board or module. The board holder in FIG. 3 is U-shaped to provide stability during the stripping option, although one of ordinary skill in the art would understand that any other suitable board holding means may be employed.

Opposite the mandrel 34, there is provided a fiber clamp 38 for securing a distal end of the optical fiber to be stripped and for sufficiently tensioning the optical fiber during the stripping operation. As with the mandrel 34, the fiber clamp 38 may be attached to the base 32, or if the base 32 is not provided, to the end of the rail 31. The fiber clamp 38 consists of a base 39a and a hinged cover 39b. To secure the distal end of the fiber, the cover 39b is opened, the fiber is placed on the base 39a, and then the top is closed. Any suitable clamping hinge may be used, such as a spring-loaded hinge or a cam, to provide the proper securing force on the fiber. Also, a longitudinal groove (not shown) may be provided in the upper surface of the base 39a for placing the fiber optic cable therein to facilitate the alignment and securing of the fiber optic cable, and to prevent damage to the fiber optic cable.

Figure 5A:
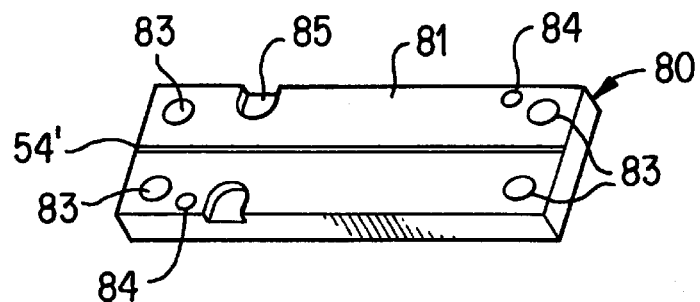
FIG. 5A is a perspective view of the bottom surface of the top plate of the cutting assembly of FIG. 4.
Figure 5B:
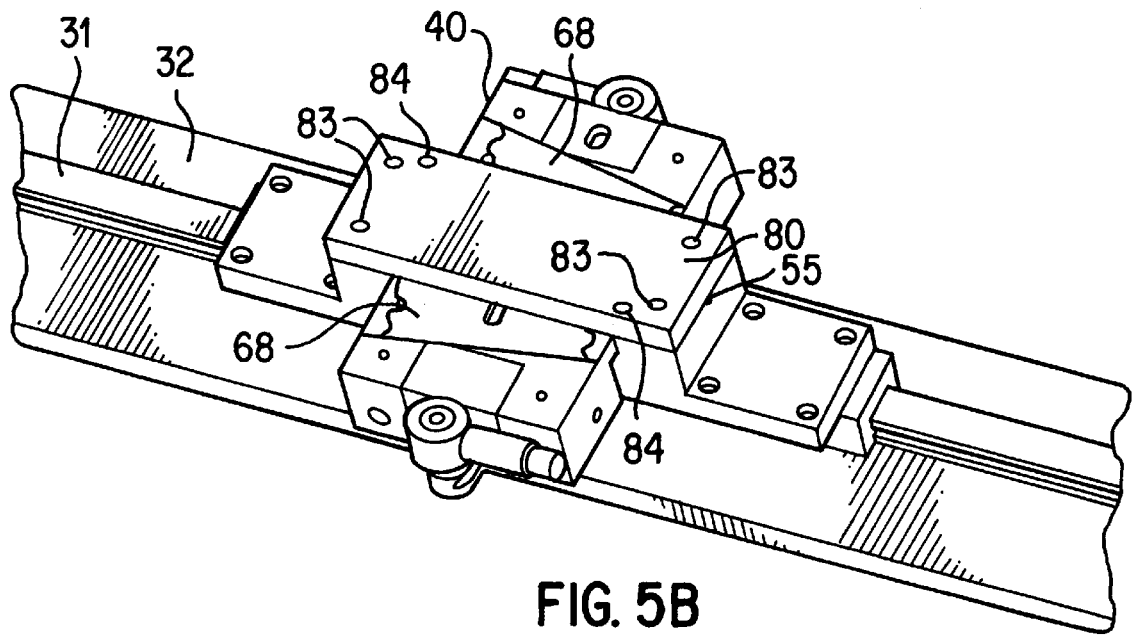
FIG. 5B is a perspective view of the top plate disposed on the cutting assembly of FIG. 4.

The cutter assembly 40 will now be described in greater detail with reference to FIG. 4. The cutter assembly 40 generally comprises a holding fixture 50, a blade mount assembly 60, and a cam assembly 70. For ease of illustrating the individual components of the cutter assembly 40, FIG. 4 depicts the cutter assembly 40 with the top plate removed. The bottom surface 81 of the top plate 80 is shown in FIG. 5A, and FIG. 5B shows the top plate 80 secured to the cutter assembly 40. As described in greater detail later, the bottom surface 81 of the top plate 80 is configured to mate with the upper surface of the lower portion of the cutter assembly.

As shown in FIG. 4, the holding fixture 50 includes an elongated base 52 attached to the slide 41. A central longitudinal groove 54 is formed in the elongated base 52 for aligning the fiber optic cable to be stripped. A pair of blade assemblies 60 are provided, one on each side opposing of the longitudinal groove 54. Note that each blade assembly 60 is slidably connected to and movable along a lateral rail 61, which in turn is attached to the holding fixture 50.

Each blade assembly 60 includes a blade base 62 and a blade 68. The upper surface 63 of the base 62 contains a lower region 64 that is stepped-down from the upper region 65 along an angled interface wall 66. The lower region 64 is stepped-down by a depth that is substantially equal to the thickness of cutting blade 68. The edge 68a of the cutting blade 68, opposite the cutting edge 68b, would contact the angled wall 66 to provide stability to the cutting blade during operation. Cutting blade 68 is a conventional cutting blade, preferably made of stainless steel or carbide steel. Since the cutting blade wears away with repeated use of the cutter assembly 40, diamond tipped cutting blades may also be employed to increase the time between required blade changes.

As shown in FIG. 4, the cutting blades 68 are disposed on the lower region 64 such that the cutting edge 68b is oriented at an acute angle α with reference to the central groove 54.

Through experimentation, it was determined that the angle a is on the order of about 5°–15° for optimum buffer layer removal, and preferably 10°, with respect to the central groove 54 of the holding fixture 50. It can be seen that the angled wall 66 is also oriented at the angle α to provide stability and precision to the cutting blades as they cut through a fiber optic cable during the buffer layer removal process. It can be appreciated that cutting angles of less than 5° or greater than 15° are contemplated within the scope of the present invention. The optimum cutting angle will be a function of the width and composition of the buffer layer to be removed, the diameter of the layer underlying the buffer layer, and the diameter of the fiber optic cable, and could be readily ascertained by one or ordinary skill in the art without undue experimentation.

Since the blades 68 are oriented at an angle, only a small portion of the cutting edge 68b, namely the cutting tip 90 (see FIG. 4 and FIG. 6), would engage the fiber optic cable. Actually, when the stripping operation is ready to be performed, the cutting tip 90 of each of the blades 68 is horizontally positioned such that each of the cutting tips 90 extends a predetermined lateral distance into the central groove 54 (or passage 55 as shown in FIG. 5B), whereby the cutting tips on either side of the central groove 54 (or passage 55) simultaneously extend into a coating of a fiber optic cable placed in the central groove 54 (or passage 55).

As described previously, the bottom surface 81 of the top plate 80 in FIG. 5A is configured to mate with the upper surface 63 of the lower portion of the cutter assembly 40. The groove 54' of the top plate 80 mates with the groove 54 of the cutter assembly 40 to form the passage 55 as shown in FIG. 5B. The top plate 80 thus secures the fiber optic cable and blades 68 in position, especially the cutting edge 68b as shown in FIG. 5B, prior to commencement of the stripping operation. The precise alignment between the top plate 80 and the cutter assembly 40 is maintained by pins threaded through alignment holes 84 extending though the top plate 80 and the cutter assembly 40. The top plate 80 and the cutter assembly 40 are secured to each other by means of screws, or other fastening devices, disposed in or threaded through fastening holes 80 in the top plate 80 and the cutter assembly 40. The recesses 85 in FIG. 5A accommodate a projecting bolt head (not shown) for generally orienting the blades 68 in the cutting assembly 40. The precise positioning of the blades 68 with respect to the fiber optic cable to be stripped will be described in greater detail later.

Since the top plate 80 as shown in FIGS. 5A and 5B would only cover a portion of the blades 68, additional cover plates may be provided to cover the remaining portions of the blades 68 and the upper surface 63 of the blade bases 62. Of course, the top plate 80 may also be configured as a unitary piece to cover the entire lower portion of the cutter assembly 40.

Referring to FIGS. 4 and 5B, note that the blade assemblies 60 are movable along a lateral rail 61 by operating a cam assembly 70 including a cam lever 72. More specifically, the blade assemblies 60 are movable between "engaged" and "disengaged" positions. By operating the cam lever 72 in a first direction, the blade assemblies 60 (and the blades 68) are moved laterally toward the groove 54 (or passage 55) so that the cutting tips 90 of the blades 68 will extend into and engage a fiber optic cable placed in the passage 55. In other words, in the engaged position the cutting tip 90 of each of the blades 68 extends a predetermined lateral distance into the passage 55, so that the cuffing tips 90 of the blades simultaneously score an outer coating of a fiber optic cable placed in the passage 55. As stated above, the cutting blades 68 are secured between the top plate 80 and the upper surface 63 of the blade assembly during the cutting operation.

After the cutting operation, the cam lever 72 is operated in a second direction. This causes the blade assemblies 60 and blades 68 to be moved away from the passage 55, such that the cutting tips 90 are moved laterally away from (i.e., disengaged from) the fiber optic cable. This allows the recently scored fiber optic cable to be removed from the cutter assembly 40 and a new fiber optic cable to be threaded through the passage 55. While a cam assembly 70 is disclosed, one of ordinary skill in the art would understand that other conventional means, such as spring-loaded mechanisms for example, can be employed to provide for engagement and disengagement of the blades of the cutting assembly 40 with the fiber optic cable.

Figure 6:
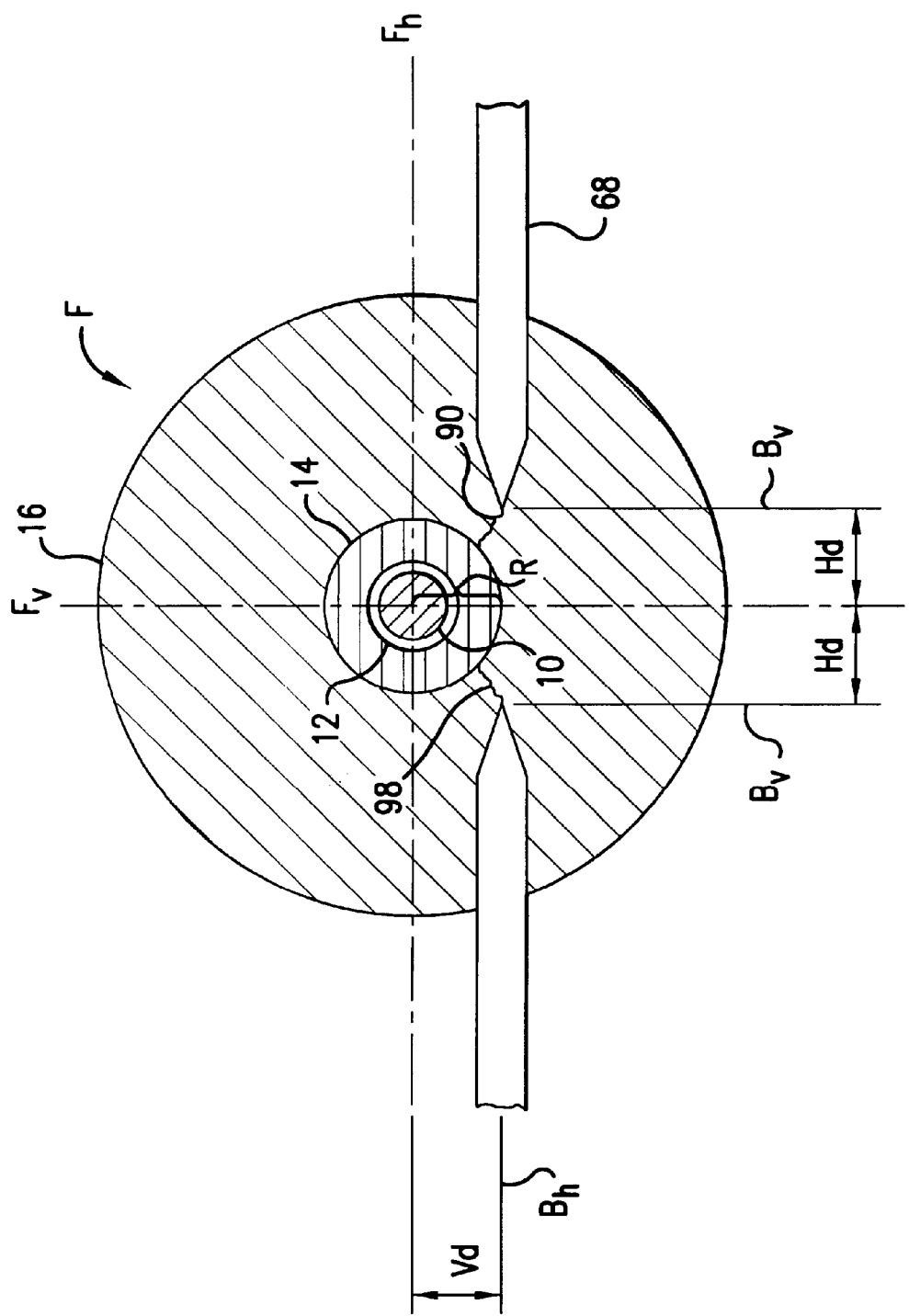
FIG. 6 is a schematic end view of the blade assembly of the present invention cutting a buffer layer to be removed.

The cutting or incision interface between the blades 68 and a fiber optic cable F is shown best in FIG. 6. In the illustrated embodiment, the fiber optic cable F includes a buffer layer 16 to be removed. The core 10, cladding 12, coating 14, and buffer 16 are configured as described previously with regard to FIG. 1 and thus is not repeated here. The dimensions in FIG. 6 are not to scale and have been exaggerated for clarity. As shown in FIG. 6 by way of example, the core region 10 is approximately nine microns (9 μm) wide, the cladding region 12 is 125 μm wide, and the protective coating 14 is 250 μm wide. The cutter assembly 40 is positioned so that the tips 90 of the blades 68 are vertically displaced from the horizontal centerline, and horizontally displaced from the vertical centerline of the fiber optic cable F.

More specifically, as shown in FIG. 6, a horizontal blade plane $B_h$ passes through the cutting tips 90 of the blades 68, and a horizontal fiber plane $F_h$ passes through a horizontal centerline of a fiber optic cable F placed in the passage 55 of the cutter assembly 40. The horizontal blade plane $B_h$ and horizontal fiber plane $F_h$ are separated by a designated vertical distance $V_d$, such that the cutting tips 90 score the outer coating 16 at a location below the horizontal centerline of the fiber optic cable F placed in the passage 55. In the embodiment of FIG. 6, this vertical distance $V_d$ is approximately equal to the radius R (125 μm±20%) of the inner coating 14 coaxially disposed along the fiber optic cable F inwardly of the outer coating 16.

Moreover, vertical blade planes $B_v$ are defined by a plane passing along the respective distal ends of the cutting tips 90, and a vertical fiber plane $F_v$ passes through the vertical centerline of the fiber optic cable F placed in the passage 55. Each of the vertical blade planes $B_v$ is separated from the vertical fiber plane $F_v$ by a designated horizontal distance $H_d$. The designated horizontal distance $H_d$ can range from a distance equal to about one-half the radius R (i.e., 65 μm±10%) to the radius R (125 μm±20%) of the inner coating 14 coaxially disposed along the fiber optic cable F inwardly of the outer coating 16.

Note that the blades 68 are positioned below the optical fiber in FIG. 6. While this is the preferred method of scoring and thereafter stripping the buffer layer, the scoring operation can be carried out at any point around the circumference of the optical fiber with the same relative spacing as described. Note also that the positioning of the horizontal and vertical planes defined by the cutting tips 90 of the blades can and should be adjusted to accommodate different-sized fiber optic cables and different-sized buffer layers or other coatings to be removed. The optimum placement of the blades is a function of the width and composition of the buffer layer to be removed, the diameter of the layer underlying the buffer layer, and the diameter of the fiber optic cable, and could be readily ascertained by one or ordinary skill in the art without undue experimentation.

Figure 7:
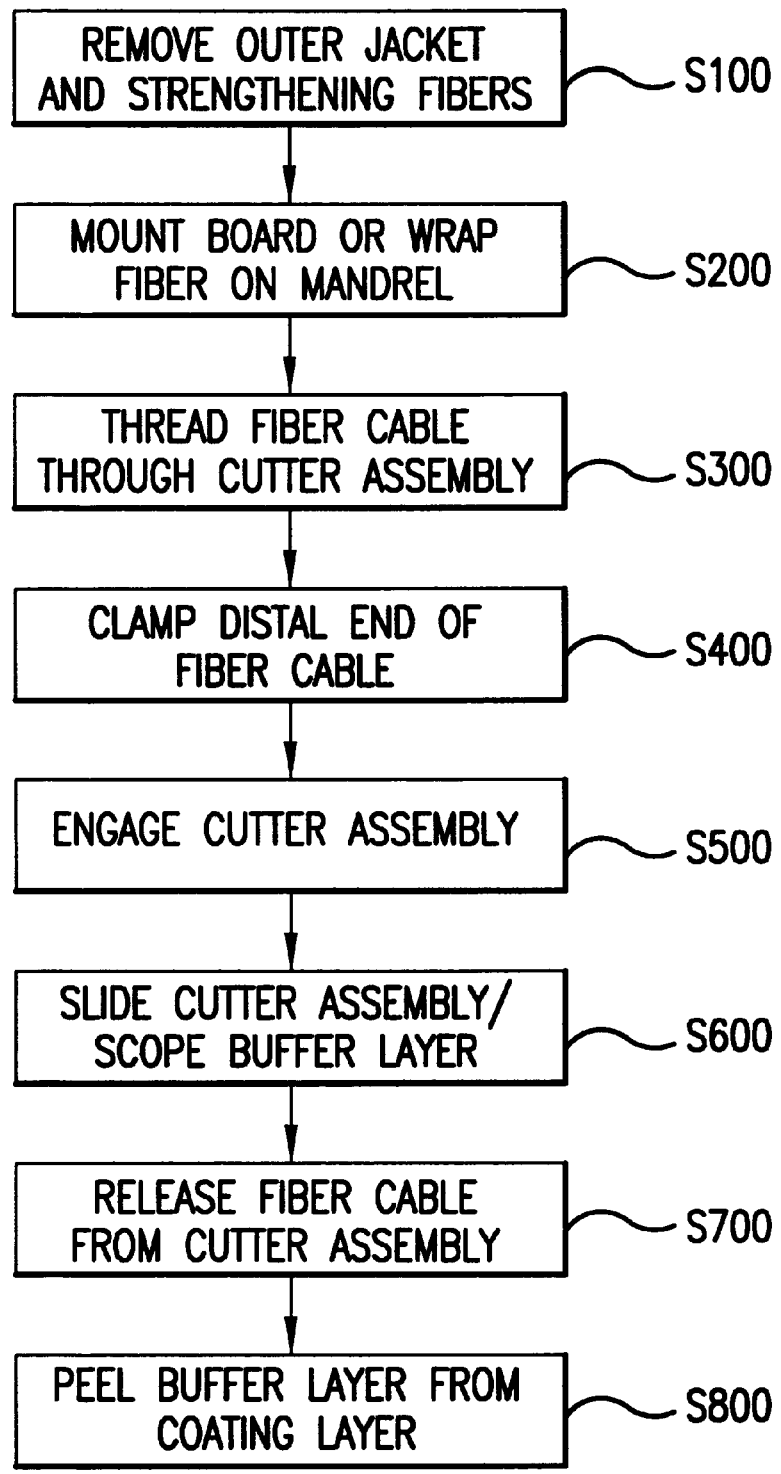
FIG. 7 is a flow chart illustrating the sequence of steps for a stripping operation using the fiber optic precision linear stripper of the present invention.

The operation of the precision linear stripper of the present invention will now be described with particular reference to FIG. 7, which depicts the method of the present invention, and with further reference to the structure depicted in FIG. 1, FIG. 3, FIG. 6. The discussion below is directed to removing the buffer layer from the fiber leads on a board assembly. The method is equally applicable regardless of whether the fiber to be stripped is part of a component of an optical board or strands of optical cable.

First, the outer jacket 18 and strengthening fibers 17 are removed by conventional means (S100) and the board assembly is secured in the board holder 36 (S200). The distal end of the fiber optic cable with the buffer layer thereon is threaded though the passage 55 of the cutter assembly 40 while the blade assemblies 60 are in a "disengaged" position (S300). In step S400, the distal end of the fiber optic cable is then pulled towards the clamp 38. The top 39b of the clamp is opened, the fiber optic cable is placed on the clamp base 39a, and then top is then closed to secure the distal end of the fiber optic cable. The fixed board holder 36 securing the board assembly provides sufficient tensioning of the opposite end of the fiber optic cable. The cam lever 72 is operated to move the cutting blades 68 laterally so that the cutting tips 90 engage the fiber optic cable threaded through the cutter assembly 40 (S500).

The operator at the stripping station then slides the cutter assembly 40 along the rail 31 from the board holder 36 towards the fiber clamp 38 in the cutting direction as shown by arrow C in FIG. 3 (S600). Alternatively, the cutter assembly 40 may be automatically propelled along the rail 31 using any suitable conventional device, such as a linear actuator or motor. When engaged as shown in FIG. 6, the precision blade incisions score the buffer layer 16, but do not contact the coating layer 14. At the end of the sliding travel, the operator releases the cable from the fiber clamp 38 and pulls the scored cable through the cutter assembly (S700). In a final step S800, the buffer layer is removed by peeling the buffer layer 16 from the coating layer 14. The peeling process is easily started by bending the distal end of the fiber such that a material shear 98 (FIG. 6) is formed in the buffer layer 16 from the inner most incision point of the blade 90 to the surface of the coating layer 14. Once the material shear 98 begins, the buffer layer 16 may be peeled away from the coating layer 14 as one would peel a banana.

Substantially the same method would be employed if a buffer layer 16 along a certain length of fiber optic cable needed to be stripped. The only difference would be in step 200, in which a portion of the fiber optic cable would be wrapped around the mandrel 34 to provide sufficient tensioning of the optical cable prior to the stripping operation.

Also, while the precision linear stripper and method of stripping of the present invention were described with respect to removing a polymeric buffer layer, the structure and principles are equally applicable to stripping or removing other polymeric and non-polymeric coatings or layers surrounding an optical fiber. When a hard coating needed to be removed, it was found that the scoring of the hard coating using the stripping method of the present invention caused the hard coating to disintegrate or fall off in pieces, rather than be peeled off as with a soft coating. As shown in FIG. 4, if a hard coating needs to be removed, a vacuum passage 95 (phantom lines) may be provided in the holding fixture 50 or blade base 62 in close proximity to the incision region of the fiber optic cable. The vacuum passage 95 may be connected to any conventional means of providing a suctioning force to suction away the pieces of the hard material that fall away from the fiber optic cable at the point of incision.

When implemented in an assembly line, the precision linear stripper of the present invention provides an efficient and economical means for removing the buffer layer from a fiber optic cable. The very precise cutting mechanism mounted on a slide rail can remove the buffer layer from any length of fiber optic cable with one smooth continuous stroke. In actual practice, the yield from the buffer layer stripping operations increased from 50% to over 90% using the precision linear stripper of the present invention.

Although preferred embodiments of the present invention have been described in detail herein above, it should be clearly understood that many variations and/or modifications of the basic inventive concepts herein taught, which may appear to those skilled in the art, will still fall within the spirit and scope of the present invention as defined in the appended claims.

What is claimed is:

1. A linear stripper for removing a coating on a fiber optic cable, the linear stripper comprising:
 a guide rail;
 a cutting assembly slidably connected to said guide rail, said cutting assembly having a passage configured to accommodate a fiber optic cable threaded therethrough, said passage being disposed along a longitudinal axis defined by the guide rail; and
 a blade assembly comprising a pair of blades disposed within said cutting assembly, each of said pair of blades being horizontally positioned on an opposing side of the passage, and wherein a cutting tip of each of said blades extends a predetermined lateral distance into said passage, such that said cutting tips of said blades simultaneously score an outer coating of a fiber optic cable placed in said passage.

2. The linear stripper as in claim 1, wherein a horizontal blade plane defined by said cutting tips of said blades within said blade assembly, and a horizontal fiber plane defined by a horizontal centerline of a fiber optic cable placed in said passage, are separated by a designated vertical distance, such that said cutting tips of said blades score the outer coating at a location below the horizontal centerline of the fiber optic cable placed in said passage.

3. The linear stripper as in claim 2, wherein said designated vertical distance is approximately equal to a radius of an inner coating coaxially disposed along the fiber optic cable inwardly of the outer coating.

4. The linear stripper as in claim 3, wherein each of a vertical blade plane defined by respective of said cutting tips of said blades, and a vertical fiber plane defined by a vertical centerline of a fiber optic cable placed in said passage, are separated by a designated horizontal distance, and wherein said designated horizontal distance is approximately equal to a radius of an inner coating coaxially disposed along the fiber optic cable inwardly of the outer coating.

5. The linear stripper as in claim 3, wherein each of a vertical blade plane defined by respective of said cutting tips of said blades, and a vertical fiber plane defined by a vertical centerline of a fiber optic cable placed in said passage, are separated by a designated horizontal distance, and wherein said designated horizontal distance is approximately equal to one-half a radius of an inner coating coaxially disposed along the fiber optic cable inwardly of the outer coating.

6. The linear stripper as in claim 1, wherein said blades are disposed at an acute angle within said cutting assembly, the acute angle being defined by a cutting edge of respective of said blades with reference to said passage, whereby only a portion of said cutting edge of said blades score an outer coating of a fiber optic cable placed in said passage.

7. The linear stripper as in claim 6, wherein said acute angle is approximately 5° to 15°.

8. The linear stripper as in claim 6, wherein said acute angle is approximately 10°.

9. The linear stripper as in claim 5, wherein said blades are disposed at an acute angle within said cutting assembly, the acute angle being defined by a cutting edge of respective of said blades with reference to said passage, whereby only a portion of said cutting edge of said blades score an outer coating of a fiber optic cable placed in said passage.

10. The linear stripper as in claim 9, wherein said acute angle is approximately 5° to 15°.

11. The linear stripper as in claim 10, further comprising a clamping mechanism disposed at one end of the guide rail, said clamping mechanism having means for securing a distal end of a fiber optic cable threaded through said cutting assembly.

12. The linear stripper as in claim 11, further comprising a mandrel disposed at an opposite end of the guide rail, said mandrel configured to accommodate a length of fiber optic cable wrapped thereon.

13. The linear stripper as in claim 12, further comprising a module board mounting bracket disposed along the guide rail, between the cutting assembly and the mandrel.

14. The linear stripper as in claim 13, further comprising a base member to which said guide rail is attached, said base member having a lateral width greater than the guide rail and a longitudinal length greater than the guide rail.

* * * * *